June 30, 1970  J. H. COWLES ET AL  3,517,965
SEAT BACK POSITION CONTROL MECHANISM
Filed Nov. 4, 1968  2 Sheets-Sheet 1
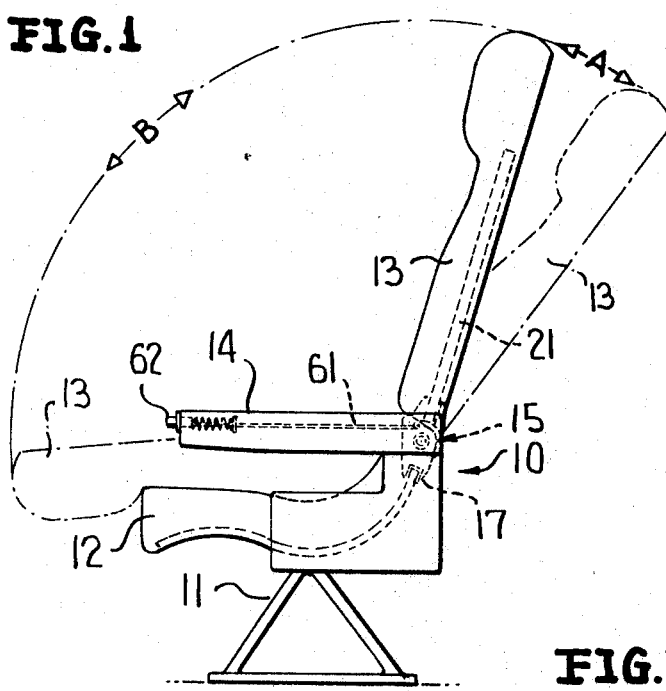
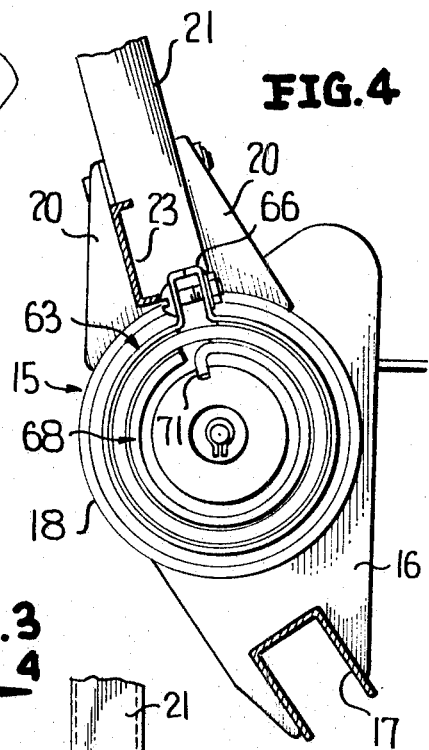
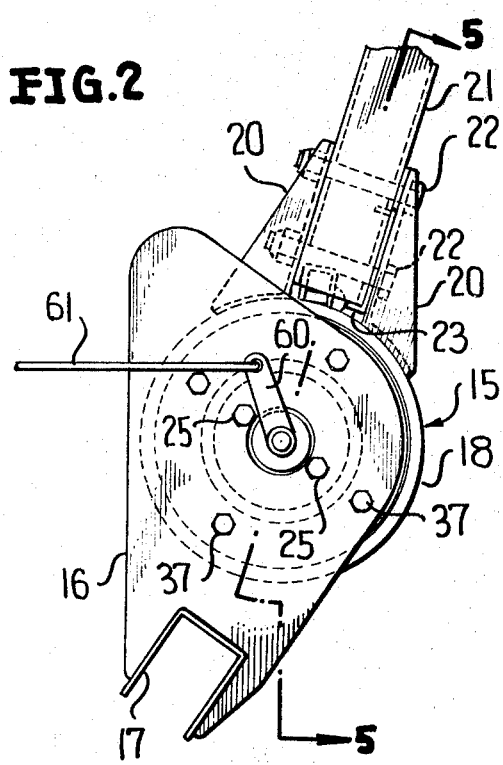
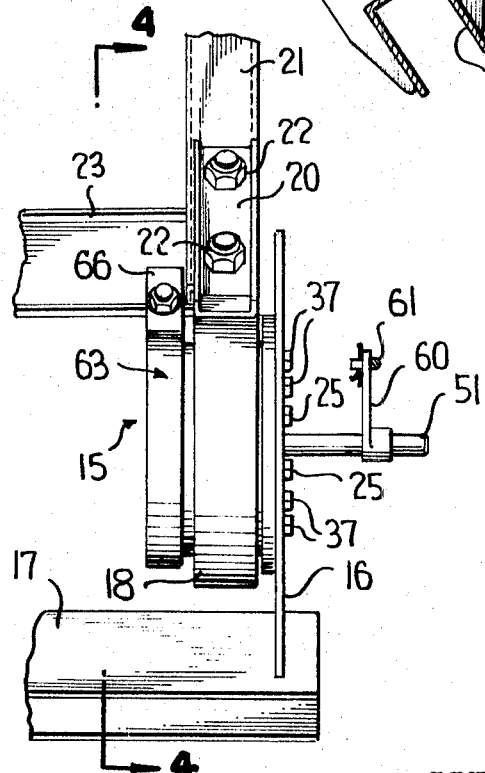
INVENTORS
JOHN H. COWLES &
ROGER G. MASSEY
BY Mason, Porter, Diller & Brown
ATTORNEYS

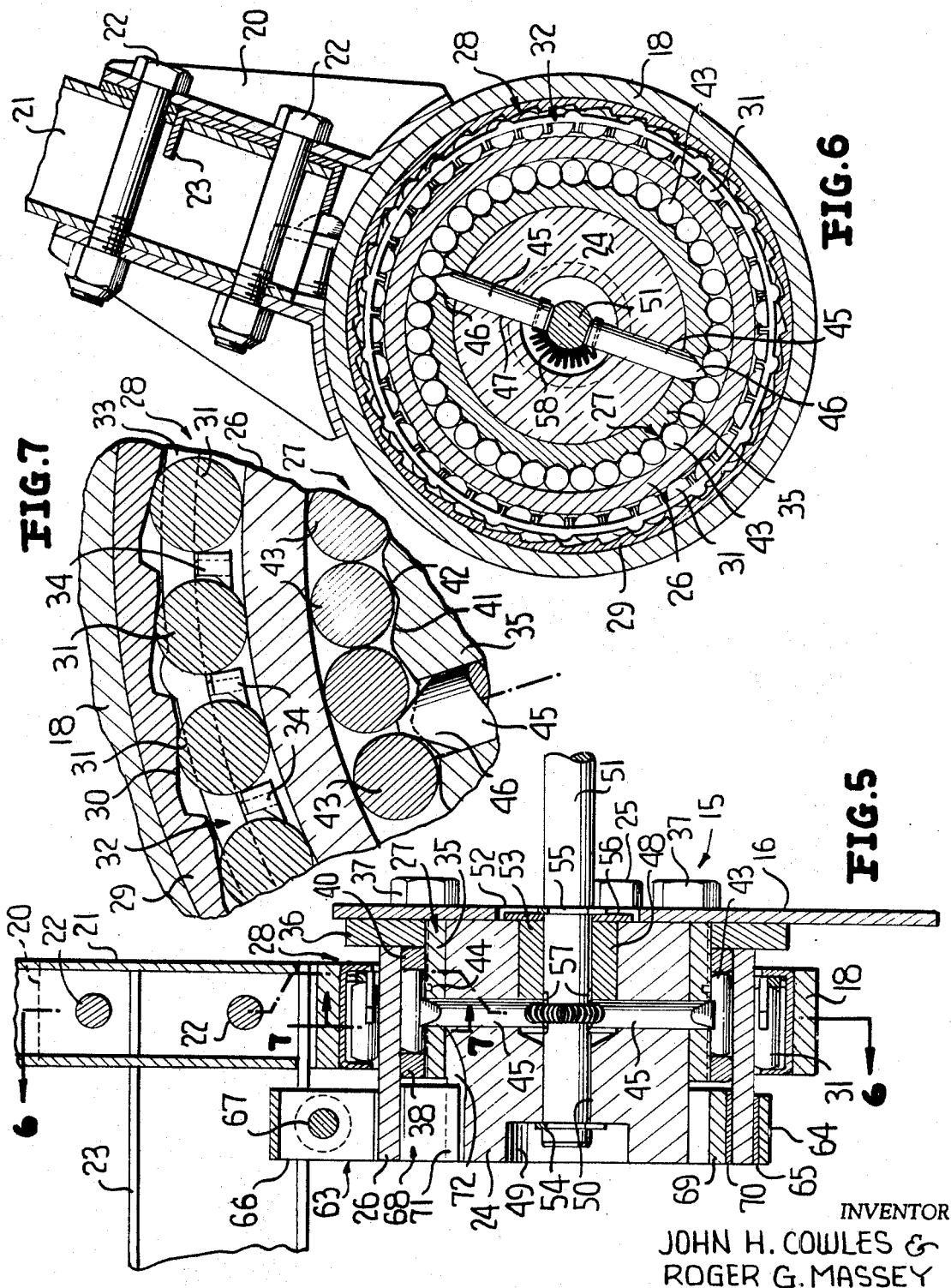

United States Patent Office

3,517,965
Patented June 30, 1970

3,517,965
SEAT BACK POSITION CONTROL MECHANISM
John H. Cowles, Forestville, and Roger G. Massey, Litchfield, Conn., assignors to The Torrington Company, Torrington, Conn., a corporation of Maine
Filed Nov. 4, 1968, Ser. No. 773,225
Int. Cl. B60n 1/04
U.S. Cl. 297—374                                    17 Claims

ABSTRACT OF THE DISCLOSURE

This disclosure relates to a seat back position control mechanism which is incorporated in one of the pivots for the seat back. The control mechanism includes a pivot shaft, an intermediate race member and a housing, the pivot shaft being secured to the support for the seat and the housing being secured to the seat back with the intermediate race member being free floating. A two way clutch is positioned between the pivot shaft and the intermediate race member to facilitate the manual releasing of the seat back and adjustment of the position thereof. A one way clutch is positioned between the intermediate race member and the housing to permit forward movement of the seat back in the case of an accident. Suitable brake means are associated with each of the clutches to provide for resisted movement of the seat back.

---

This invention relates in general to new and useful improvements in control mechanisms and more particularly to a seat back position control mechanism.

Long distance conveyances use seats in which the backs thereof are reclinable to various positions. At the present time, the more refined ones of these seats utilize a hydraulic mechanism. However, the hydraulic mechanisms have a tendency to leak. In addition, there are other limitations of the hydraulic mechanisms, such as piston stroke and developed reaction pressure.

It is the primary object of this invention to provide a novel seat back position control mechanism which overcomes the deficiencies of existing control mechanisms.

In accordance with this invention, there is incorporated in one of the pivots for the seat back a position control mechanism which utilizes clutches for releasably locking the seat back in the desired positions and for releasing the seat back when an accident occurs. These clutches are relatively simple and are economically feasible. In addition, the clutches may be assembled in a relatively compact unit so as to meet both the space and weight requirements with respect to seats.

Another feature of this invention is to provide a position control mechanism for seat backs, the position control mechanism including a simple overrunning clutch which is operable to lock the seat back against rearward movement, but which will permit the forward movement of the seat back, and there being associated with this overrunning clutch a brake which applies a predetermined torque on the control mechanism to resist the forward movement of the seat back under normal conditions, but which permits the resisted forward movement of the seat back in the case of an accident.

A further feature of this invention is to provide in a position control mechanism for a seat back, a two way clutch, the two way clutch being manually operable to release the seat back for pivotal movement whereby the position of the seat back may be readily adjusted and the seat back retained in its adjusted position, and there being associated with the two way clutch a self-energizing overrunning friction control torque brake which applies a controlled resistance to the control mechanism against the pivoting of the seat back whereby there will not be an abrupt movement of the seat back when the two way clutch is released, the brake providing a greater resistance to rearward movement of the seat back than to forward movement thereof.

A further object of this invention is to provide a novel seat back position control mechanism which is of an extremely simple and compact construction which provides for the positive positioning of a seat back, which for all practical purposes has no material component thereof subject to failure, and which control mechanism may be readily incorporated in existing seat designs.

With the above and other objects in view that will hereinafter appear, the nature of the invention will be more clearly understood by reference to the following detailed description, the appended claims and the several views illustrated in the accompanying drawings.

In the drawings:

FIG. 1 is a side elevational view of a conventional type of seat having an adjustable back, which seat has incorporated therein the seat back position control mechanism.

FIG. 2 is a side elevational view on an enlarged scale of the seat back position control mechansm shown attached to the seat bottom mounting bracket and the seat back frame.

FIG. 3 is a fragmentary front elevational view of the control mechanism mounted on the seat bracket.

FIG. 4 is a vertical sectional view taken along the line 4—4 of FIG. 3 and shows the mounted control mechanism from the side thereof opposite to that shown in FIG. 2.

FIG. 5 is an enlarged vertical sectional view taken along the line 5—5 of FIG. 2 and shows specifically the construction of the control mechanism.

FIG. 6 is an enlarged vertical sectional view taken along the line 6—6 of FIG. 5 and shows more specifically the arrangement of the clutches thereof.

FIG. 7 is an enlarged fragmentary sectional view taken along the line 7—7 of FIG. 5 and shows more specifically the details of the clutches and with the two way clutch being in its released position.

Referring now to the drawings in detail, it will be seen that there is illustrated in FIG. 1 the seat of the reclining back type to which this invention relates, the seat being generally identified by the numeral 10. The seat 10 includes basically a supporting frame 11 on which there is constructed a seat bottom 12. A seat back 13 is pivotally connected to the upper rear portion of the support 11 with the normal position thereof being shown in solid lines, and with the seat back 13 being movable in the direction A to a reclining position and in the direction B to a position overlying the seat bottom 12. The seat 10 also is provided with the conventional arm rest 14.

The pivotal mounting of the seat back 13 relative to the support 11, on one side of the seat, is conventional. On the other side of the seat, the pivotal mounting of the seat back 13 is accomplished by means of the position control mechanism which is the subject of this invention, the position control mechanism being generally identified by the numeral 15.

Referring next to FIGS. 2, 3 and 4, it will be seen that the control mechanism 15, among other details, is fastened to the support or bracket 16 which is part of the seat bottom frame. The control mechanism 15 also includes a housing 18 in the form of a ring which is rotatable about the axis thereof relative to the bracket 16. The housing 18 has permanently secured thereto a pair of circumferentially spaced brackets 20 which are mounted in opposed relation and which are secured to the lower portion of a frame 21 of the seat back 13 by means of nut and bolt assemblies 22. It is to be noted at this time that the frame 21 includes a transverse frame member 23 of a channel configuration.

Reference is now made to FIGS. 5 and 6 wherein the specific internal construction of the control mechanism 15 is illustrated. It is to be noted that the conrol mechanism 15 includes a centrally disposed support shaft or pivot shaft 24 which is fixedly secured to the support 16 by a pair of bolts 25 which pass through the support 16 and are threaded into one end of the pivot shaft 24. It is to be noted that the pivot shaft 24 is disposed concentric to the housing 18.

The control mechanism 15 also includes an intermediate race member 26. The race member 26 is disposed intermediate the pivot shaft 24 and the housing 18 and is concentric therewith.

A two way clutch, which is generally identified by the numeral 27, is positioned intermediate the pivot shaft 24 and the intermediate race member 26 with the race member 26 forming an outer race of the clutch 27. A second and outer clutch, which is generally referred to by the numeral 28, is positioned between the housing 18 and the intermediate race member 26 with the race member 26 forming an inner race of the clutch 28. The clutch 28 is one way overrunning clutch.

In view of the fact that the one way overrunning clutch 28 is a conventional clutch, it will be described first. The clutch 28, with particular reference to FIG. 6, prevents clockwise movement of the housing 18 relative to the race member 26, but permits freedom of rotation of the housing 18 in a counterclockwise direction relative to the race member 26.

The clutch 28 includes a cup shaped outer clutch member 29 which is preferably formed of sheet metal and which is tightly pressed within the housing 18. The clutch member 29 is provided on the inner surface thereof with a plurality of circumferentially spaced, longitudinally extending cam surfaces 30. A roller 31 is maintained in associated relation with respect to cam surface 30 by means of a retainer which is identified by the numeral 32. Basically, the retainer 32 includes an end ring 33 having a plurality of axially extending fingers 34 extending therefrom. The fingers 34 combine to define pockets for the rollers 31 and serve to resiliently urge the rollers 31 into engagement with the cam surfaces 30.

It will be readily apparent from FIG. 7, which is taken from the opposite side of the clutch 28 from FIG. 6, that when the housing 18 is moved in a counter clockwise direction (clockwise in FIG. 6), the rollers 31 will wedge between the cam surfaces 30 and the outer race surface of the intermediate race member 26 and thus lock the housing 18 to the race member 26. On the other hand, when the housing 18 is rotated in a clockwise direction, as viewed in FIG. 7 (counterclockwise in FIG. 6), the rollers 31 will merely roll relative to the cam surfaces 30 and there will be freedom of rotation of the housing 18 relative to the race member 26. Accordingly, it will be apparent that the seat back 13 will be fixed against rearward movement by the clutch 28, but permitted to move freely forwardly by the same clutch.

The clutch is of a materally different construction from the clutch 28. The clutch 27 includes an inner clutch member or ring 35 which is telescoped over the pivot shaft 24 and has one end thereof abutting against the support 16. The inner clutch member 35 has tightly pressed onto the end thereof which abuts the support 16, a mounting ring 36. The mounting ring 36 has internal cam shaped surfaces complementary to those of inner clutch member 35 and is fixedly secured to the support 16 by a plurality of circumferentially spaced bolts 37 which pass through the support 16 and are threaded into the ring 36. Torque from the seat back is then transmitted through inner clutch member 35 to support ring 36 thence to support 16.

The intermediate race member 26 is mounted on the inner clutch member 35 for relative rotation by means of a pair of axially spaced bearing rings 38 and 40. The bearing ring 38 is disposed on the end portion of the inner clutch member 35 disposed remote from the support 16 while the bearing ring 40 is disposed immediately adjacent the ring 36.

Referring now to FIG. 7 in particular, it will be seen that the inner clutch member 35 has formed on the outer surface thereof a plurality of longitudinally extending cam surfaces 41 and 42 which are arranged in sets and define generally V-shaped pockets in which rollers 43 are seated. The rollers 43, when centered in their respective pockets, are free to rotate without wedging engagement with the inner clutch member 35. The rollers 43 are urged into engagement with the race member 26 by means of a C-shaped spring 44 which is seated in an annular groove formed in the outer surface of the inner clutch member 35. However, the rollers 43 are normally free to engage one of the adjacent cam surfaces 41 and 42, depending upon the direction of rotation of the intermediate race member 26 relative to the pivot shaft 24. When this occurs, there is a wedging of the roller between the respective cam surface and the inner surface of the intermediate race member 26. Accordingly, the clutch 27 normally prevents rotation of the intermediate race member 26 relative to the inner clutch member 35 and the pivot-shaft 24.

In order that the clutch 27 may be manually rendered inoperative, there is carried by the pivot shaft 24 and the inner clutch member 35 a pair of releasing pins 45. The pins 45 are disposed in diametrically opposite relation and have wedge shaped outer end portions 46 engageable between a pair of adjacent rollers 43. The releasing pins 45, which are normally disposed in retracted positions, when projected, position the rollers 43 in centered relation in their respective pockets between the two cam surfaces 41 and 42 defining each pocket, with the result that the intermediate race member 26 is free to rotate relative to the inner clutch member 35 and the pivot shaft 24.

It is to be noted from FIG. 6 that the inner clutch member 35 is provided with a pair of diametrically aligned bores 46 through which the extreme ends of the releasing pins 45 project. The bores 46 are, in turn, aligned with a diametrical bore 47 through the pivot shaft 24. The bore 47 opens into an axial counter bore 48 formed in that end of the pivot shaft 24. A second axial counter bore 49 is formed in the opposite end of the pivot shaft 24. In addition, the pivot shaft 24 is provided with a concentric bore 50 which opens into the counter bores 48 and 49.

The pivot shaft 24 has rotatably journalled therein a clutch releasing shaft 51 which passes through the bore 50 and which projects outwardly beyond the support 16, the support 16 having a large opening 52 therein aligned with the counterbore 48. The shaft 51 is primarily supported by a bushing 53 which is seated in the counter bore 48, but terminates with clearance with a peripheral portion of the bore 47.

The shaft 51 is retained in place by means of a snap ring 54, which is positioned within the counterbore 49. A second snap ring 55 is carried by the shaft 51 adjacent the bushing 53 and is separated from the bushing 53 by means of a thrust washer 56.

It is to be noted that the portion of the shaft 51 which is aligned with the bore 47 is provided with a pair of diametrically opposite flats 57 with which the inner ends of the releasing pins 45 are engaged. The releasing pins 45 are held in contact with the shaft 51 by means of a spring 58.

It is to be understood that the spring 58 normally serves to hold the releasing pins 45 in their retracted position whereby the clutch 27 is in its operative position so as to lock the intermediate race member 26 against rotation relative to the inner clutch member 35 and the pivot shaft 24. However, when the shaft 51 is rotated, the flats 57 will function as cam surfaces and force the releasing pins 45 radially outwardly between the rollers 43 so as to release the clutch 27.

Referring now to FIGS. 1, 2 and 3, in particular, it will be seen that the projecting end of the shaft 51 is provided with a lever 60 to which there is connected a control arm 61. The control arm 61, in turn, passes through the arm 14 of the chair. The forward end of the shaft 61 has a pushbutton 62 associated therewith for effecting the rotation of the shaft 51 to move the clutch 27 to a released position.

It will be readily apparent that the clutches 27 and 28 provide an operable structure. However, utilizing solely the clutches 27 and 28, it will be seen that there is nothing to prevent the seat back 13 from moving forwardly in the direction B of FIG. 1 in that the clutch 28 functions in only one direction. Furthermore, it will be readily apparent that when the clutch 27 is released, nothing will prevent the seat back 13 from freely moving in any direction and when a person is reclining against the seat back 13 and the button 42 is pushed, the person will receive an immediate rearward jolt as the seat back 13 drops out from behind him. Accordingly, in order to provide for a smooth and efficient operation of the seat back 13, the control mechanism 15 also includes a pair of brakes which will be described in detail hereinafter.

With reference to FIG. 5, it is to be noted that the inner clutch member 35 terminates short of the end of the pivot shaft 24 disposed remote from the support 16. On the other hand, it is to be noted that the intermediate race member 26 has the left end thereof, as viewed in FIG. 5, in alignment with the left end of the pivot shaft 24. It is to be further noted that the entire clutch assembly 28 is recessed with respect to both ends of both the pivot shaft 24 and the intermediate race member 26. Accordingly, at the inner or left end of the control mechanism, as viewed in FIG. 5, space is provided for the two brakes.

The first brake is a controlled brake which is generally referred to by the numeral 63. The brake 63 includes a band 64 having a lining 65 with the band 64 clamping the lining 65 against the outer surface of the race member 26. The end portions of the bands 64 are bent to define a loop 66 which has a nut and bolt assembly 67 extending therethrough. The nut and bolt assembly 67 is adjustable to vary the clamping action of the lining 65 against the race member 26, thereby varying the amount of torque required to turn the race member 26 relative to the brake 63.

It is to be noted from FIG. 4 in particular that the loop 66 is positioned for engagement with the channel shaped frame member 23 of the seat back frame 21 when the seat back frame 13 is moved forwardly while the race member 26 is held against rotation by the clutch 27.

It will thus be apparent that while the clutch 28 permits the free movement of the seat back 13 forwardly, and the seat back 13 is free to move forwardly under high forces, normally the brake 63 will serve to prevent the seat back 13 from moving forwardly relative to the race member 26. On the other hand, in the case of an accident, when sufficient pressure is applied against the seat back it will move forwardly. Thus, the brake member 63 will in effect function as a brake in combination with the seat back 13.

The second brake is identified by the numeral 68 and is positioned between the pivot shaft 24 and the intermediate race member 26. The brake 68 is a self-energizing brake which allows development of a predetermined torque before slipping in a counterclockwise direction, as viewed in FIG. 4. The brake 68 is in the form of a band 69 having a lining on the outer surface thereof, the lining 70 being in frictional contact with the inner surface of the race member 26. The brake 68 is generally circular in outline, as is best shown in FIG. 4, and includes an anchoring tab 71 which is received in a keyway formed in the periphery of the pivot shaft 24, as is clearly shown in FIG. 5.

In view of the foregoing, it will be apparent that as a person leans back in the seat 10, torque is transmitted through the overrunning clutch 28 into the race member 26 and, in turn into both the brake 68 and the two way clutch 27. Therefore, the torque on the two way clutch 27 is lowered, thereby reducing the amount of force required on the releasing button 62 to turn the releasing actuating shaft 51.

It will also be readily apparent that when the intermediate race member 26 is released to rotate about the pivot shaft 24, the seat back 13 does not fly back in that the brake 68 absorbs the energy released by the clutch 27.

It is also pointed out here that while the brake 68 functions to resist the rearward movement of the seat back 13 when the clutch 27 is released, the brake 68 slips with very little resisting torque when the seat back 13 is being pulled to an upright position.

It will be readily apparent that the combination of the two clutches 27 and 28 and the two brakes 63 and 68 provides for a positive seat back position control which not only permits the comfortable adjustment of the seat back position, but also permits the seat back to pivot forwardly in the case of an accident and wherein a relative great force is applied to the rear of the seat back. In addition, the brake 63 permits the seat back to function as a shock absorber in that it retards the forward movement of the seat back under accident conditions. In addition, it will be readily apparent that the control mechanism is a positive acting one and does not have the deficiencies of other well known seat back position control mechanisms.

Although only a preferred embodiment of the invention has been specifically illustrated and described herein, it is to be understood that minor variations may be made in the position control mechanism without departing from the spirit of the invention.

We claim:

1. A position control mechanism for a pivotally mounted member, said mechanism comprising a support, a pivot shaft carried by said support, a housing disposed concentric to said pivot shaft, and means mounting said housing on said pivot shaft for controlled pivoting relative thereto, said mounting means including a two way clutch and a one way clutch disposed in concentric relation.

2. The position control mechanism of claim 1 wherein there is a free floating intermediate race member disposed between said clutches and forming a race member of each of said clutches.

3. The position control mechanism of claim 1 wherein said housing is normally urged in the one direction opposed by said one way clutch, and brake means resisting movement of said housing opposite to said one direction to prevent abrupt movement of said housing opposite to said one direction.

4. The position control mechanism of claim 1 wherein there are brake means resisting movement of relatively movable components of said two way clutch whereby when said two way clutch is released movement of said housing relative to said support will be retarded.

5. The position control mechanism of claim 4 wherein said housing is normally urged in one direction and said brake means has a greater braking action in said one direction.

6. The position control mechanism of claim 5 wherein said one direction is opposite to the released direction of said one way clutch and second brake means resisting movement of said housing opposite to said one direction to prevent abrupt movement of said housing opposite to said one direction.

7. The position control mechanism of claim 1 wherein there is a free floating intermediate race member disposed between said clutches and forming a race member of each of said clutches, said two way clutch is between said pivot shaft and said intermediate race member, and said one way clutch is between sadi intermediate race member and said housing.

8. The position control mechanism of claim 1 wherein there is a free floating intermediate race member disposed between said clutches and forming a race member of each of said clutches, said two way clutch is between said pivot shaft and said intermediate race member, and said one way clutch is between said intermediate race member and said housing, said two way clutch being a manually releasable clutch and said one way clutch being an overrunning clutch.

9. The position control mechanism of claim 4 wherein there is a free floating intermediate race member disposed between said clutches and forming a race member of each of said clutches, said two way clutch is between said pivot shaft and said intermediate race member, and said one way clutch is between said intermediate race member and said housing, said two way clutch being a manually releasably clutch and said one way clutch being an overrunning clutch.

10. The position control mechanism of claim 1 wherein there is a free floating intermediate race member disposed between said clutches and forming a race member of each of said clutches, said two way clutch is between said pivot shaft and said intermediate race member, said one way clutch is between said intermediate race member and said housing, first brake means between said pivot shaft and said intermediate race member, and second brake means between said intermediate race member and said housing.

11. The position control mechanism of claim 1 wherein said two way clutch includes a cylindrical race member and a clutch member disposed in concentric relation, a plurality of rollers between and in rolling engagement with said race member and said clutch member, said clutch member having a pocket for each roller and each pocket having opposed cam surfaces operable to effect a wedging of said rollers between said clutch member and said race member, and manually operable means for moving said rollers to centered released positions in said pockets.

12. The position control mechanism of claim 11 wherein manually operable means includes a pair of diametrically oppositely directed wedges engageable between said rollers.

13. The position control mechanism of claim 11 wherein manually operable means includes a pair of diametrically oppositely directed wedges engageable between said rollers, and a rotatable cam engaged with said wedges to effect the projection thereof.

14. The position control mechanism of claim 13 wherein said two way clutch is directly connected to said pivot shaft, and said rotatable cam is carried by said pivot shaft.

15. The position control mechanism of claim 1 wherein said position control mechanism is part of a seat having an adjustable back, said support is part of supporting structure of said seat and said housing has seat back supporting means carried thereby.

16. The position control mechanism of claim 1 wherein said position control mechanism is part of a seat having an adjustable back, said support is part of supporting structure of said seat and said housing has seat back supporting means carried thereby, said seat having manually operable means for releasing said two way clutch to permit adjustment of said seat back and said one way clutch being operable to release said seat back for forward movement under emergency conditions.

17. The position control mechanism of claim 1 wherein said position control mechanism is part of a seat having an adjustable back, said support is part of supporting structure of said seat and said housing has seat back supporting means carried thereby, said seat having manually operable means for releasing said two way clutch to permit adjustment of said seat back and said one way clutch being operable to release said seat back for forward movement under emergency conditions, said one way clutch having coupled in cooperating relation therewith brake means resisting the forward movement of said seat back.

References Cited
UNITED STATES PATENTS

| | | | |
|---|---|---|---|
| 3,216,766 | 11/1965 | Tabor | 297—379 |
| 3,309,138 | 3/1967 | Byczkowski | 297—355 |
| 3,356,415 | 12/1967 | Putsch | 297—379 |
| 3,423,785 | 1/1969 | Pickles | 16—140 |
| 3,426,386 | 2/1969 | Wise | 16—140 |

REINALDO P. MACHADO, Primary Examiner

U.S. Cl. X.R.
16—140; 297—379